Nov. 3, 1964     C. L. SPORCK     3,155,008
METAL WORKING
Filed May 21, 1962     2 Sheets-Sheet 1
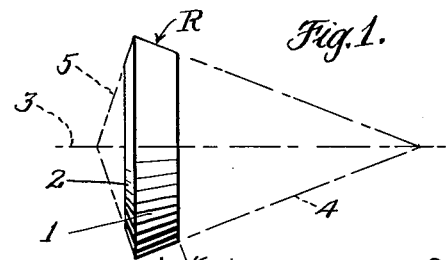
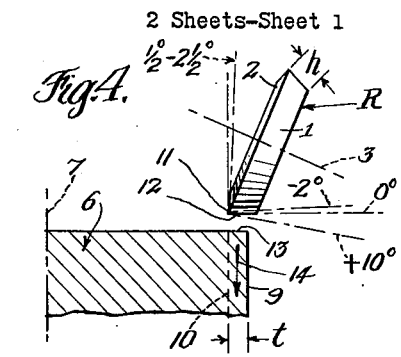
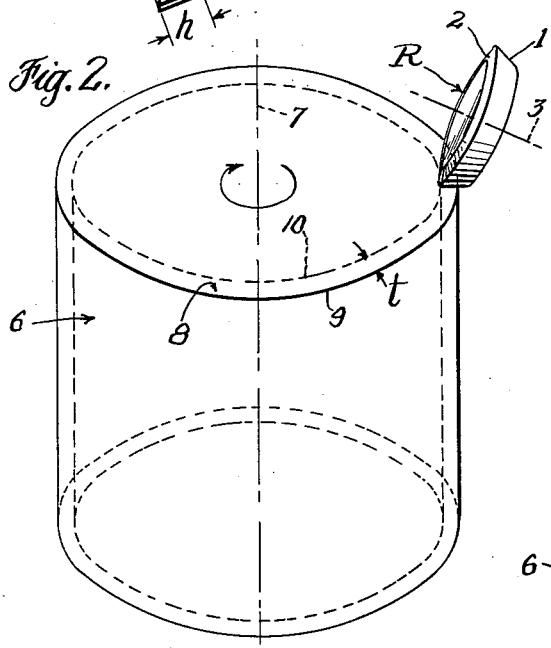
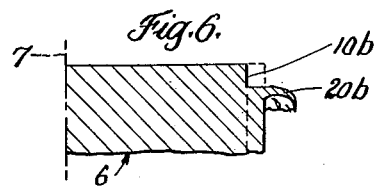
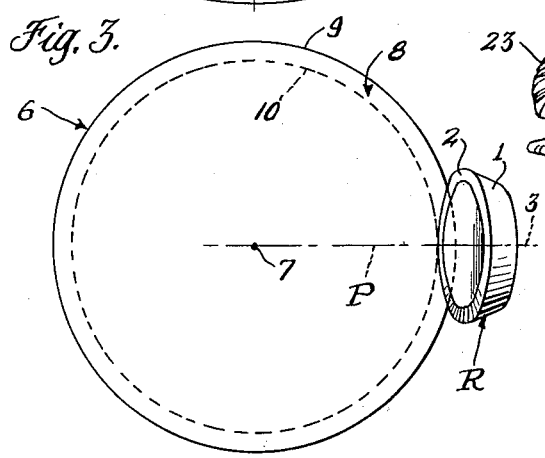
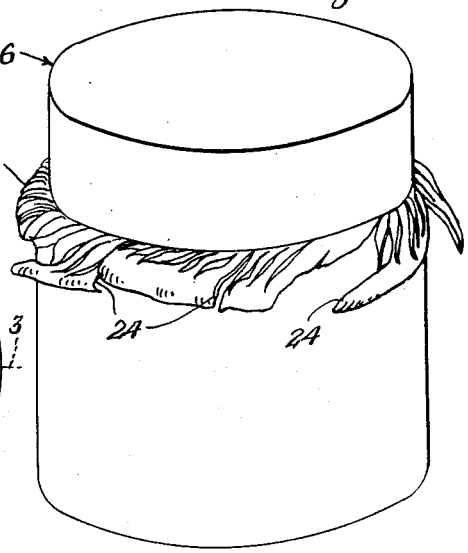
INVENTOR.
Claus L. Sporck
BY Synnestvedt & Lechner
ATTORNEYS

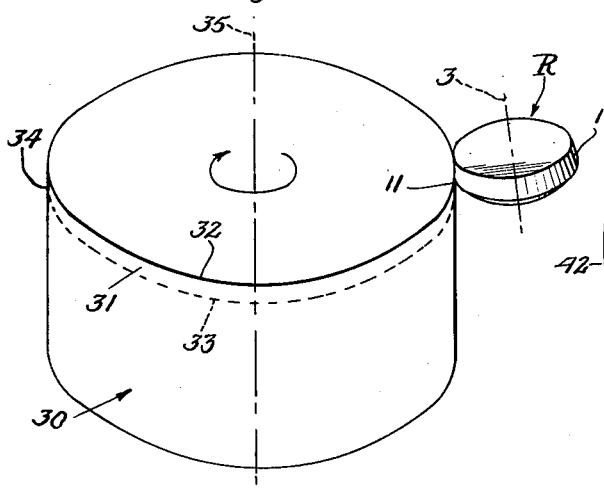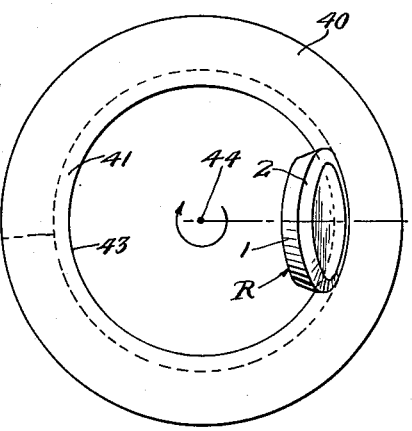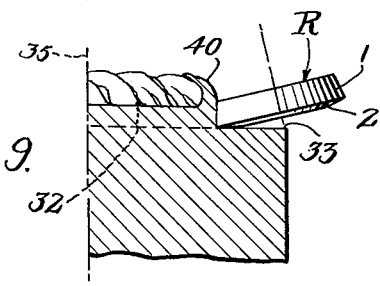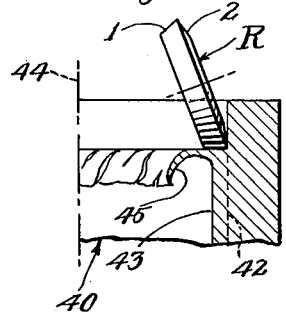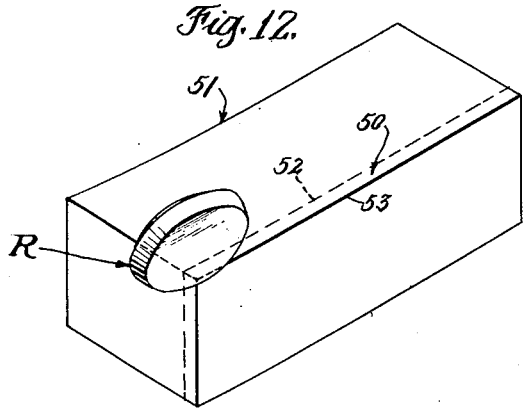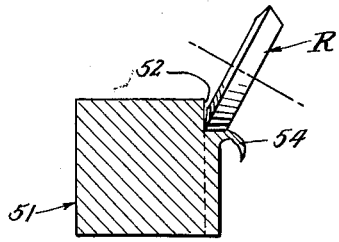
INVENTOR.
Claus L. Sporck
BY
Synnestvedt & Lechner
ATTORNEYS United States Patent Office 3,155,008
Patented Nov. 3, 1964

3,155,008
METAL WORKING
Claus L. Sporck, Cincinnati, Ohio, assignor to The Lodge & Shipley Company, Cincinnati, Ohio, a corporation of Ohio
Filed May 21, 1962, Ser. No. 196,055
5 Claims. (Cl. 90—24)

This invention relates to methods for removing metal from blanks and more particularly relates to methods for removing or peeling a finite thickness of surface metal from a blank without the use of cutting tools.

The invention provides new and novel ways of removing metal from various common blank configurations which heretofore has been accomplished by conventional turning, facing or boring methods and tools. For example, the invention contemplates the peeling of surface metal such as, for example, a generally flat surface on a plate, ingot or billet, the outside peripheral surface on a rod, bar or billet, the end surface on a billet and the inside or outside peripheral surface of a tubular part.

For peeling or removing the surface, the invention in its broadest aspect contemplates continuously applying forces over small contiguous areas, the forces developing a shearing and plastic flow which results in separating the surface metal from the main body of the blank. According to the invention the peeling or removal of the surface metal is accomplished by way of a roller having a peripheral, conical surface which is engaged with and relatively moved with respect to the surface to be peeled in a manner to effect the shearing and plastic flow.

The invention finds especial utility in the preparation of ingots, billets, rods, tubes and bars made of high grade alloy steels, refractory metals, aluminum and the like, where removal of contaminated or fissured surfaces is a necessary and commonplace operation.

One important overall advantage of the invention is that it provides for the removal of surface metal at a rate several times greater than the rate at which the same surface can be removed by a conventional cutting tool.

Another advantage of the invention is that high speed surface peeling or removal can be accomplished without frequent replacement of the roller or tool.

The manner of practicing the invention will be described below in connection with the following drawings wherein:

FIGURE 1 is a side elevational view of a typical roller for use in practicing the methods of the invention;

FIGURE 2 is a diagrammatic view of a blank having an outside peripheral surface which is to be removed;

FIGURE 3 is a plan view of the blank of FIGURE 2;

FIGURES 4, 5 and 6 are fragmentary sectional views diagrammatically illustrating the manner in which the peripheral surface of the blank of FIGURE 2 is removed or peeled;

FIGURE 7 is an enlarged perspective view of a blank such as the blank of FIGURE 1 wherein the surface metal is partially peeled;

FIGURE 8 is a diagrammatic view of a blank having an end surface or face which is to be removed or peeled off;

FIGURE 9 is a fragmentary sectional view of the blank of FIGURE 8 illustrating the manner in which the roller is used to peel off the end surface;

FIGURE 10 is a diagrammatic view of the blank having a generally cylindrically-shaped inside peripheral surface which is to be removed;

FIGURE 11 is a fragmentary sectional view of the blank of FIGURE 10 illustrating the manner in which the roller is used to peel off the peripheral surface;

FIGURE 12 is a diagrammatic view of a blank having a generally planar surface which is to be removed; and FIGURE 13 is a fragmentary sectional view of the blank of FIGURE 10 illustrating the manner in which the roller is used to peel off the flat surface.

Referring to FIGURE 1, the roller R has a configuration which is necessary for practicing the invention. The roller has a peripheral, conical-shaped surface 1 and an adjacent peripheral, conical-shaped surface 2. Both of these surfaces are co-axial with the rotational axis of the roller 3. The projection of the surface 1 as indicated by the dotted lines 4 intersects the axis 3, and the projection of the surface 2 indicated by the dotted lines 5 also intersects the axis 3.

The surface 1 on the roller R is the actual working surface, that is to say, this is the surface which produces the forces necessary to develop the shear and plastic flow phenomena used in peeling off the blank surface. The slant height $h$ or width of the conical surface is important in that its dimension must be at least as great as and preferably greater than the thickness dimension of the surface to be peeled. The surface 2 in itself does not develop the forces necessary for shear and plastic flow. However, the surface 2 serves a useful purpose because it irons those portions of the blank from which the surface has been peeled and operates to produce a finishing effect on the blank.

Referring to FIGURE 2, the blank 6 and the roller R can be supported by known equipment, for example, by a machine such as is shown in my copending application 765,878, Patent No. 3,137,259 issued June 16, 1964. In such a machine the blank 6 appropriately is supported for rotation about the axis 7. The roller R is supported on the machine carriage for motion in a direction which is generally parallel to the rotational axis 7. The mounting of the roller must provide for orientation of the roller as explained later.

The blank 6 has an outside peripheral surface 8 whose thickness is indicated by $t$ and outer and inner boundaries indicated at 9 and 10. As shown, the blank has a generally cylindrical configuration and may be in the form of a billet or rod or some other like part, whose surface is to be removed. The manner in which the roller R is oriented and moved to peel off the surface 8 is explained below. It might be mentioned here, however, that for the working operation the roller is moved parallel to the axis 7.

Referring to FIGURE 3, the roller R (in plan) is positioned so that its rotational axis 3 lies in a vertical plane P which contains the blank rotation axis 7. Referring to FIGURE 4, the roller (in elevation) is oriented so that its rotational axis 3 is tilted in the plane P. The intersection of the surfaces 1 and 2 in the plane P is indicated at 11. The interesection of the slant height $h$ of surface 1 with the plane P is indicated by the line 12.

The roller R is tilted so that the working surface 1 has the proper orientation to effect peeling. This orientation is called the work surface lead angle and is determined by the angular orientation of the line 12 with respect to projection of the boundary 10 in the plane P.

As shown, the roller is tilted so that the line 12 is at 90° to the boundary projection or has a zero lead angle. In some instances, the roller is tilted so that the line 12 is approximately 88° (acute in a direction opposite roller feed) so that the lead angle is −2°. In other instances, the roller is oriented so that the line 12 is approximately 80° (acute in a direction of roller feed) so that the lead angle is +10°. The lead angle of the working surface 1 depends principally on the type of material being worked, surface thickness, blank rotational speed and roller feed rate. Lead angles within the range mentioned above give satisfactory performance. The range is not absolutely critical; however, it is pointed out that the magnitude of the negative lead angle must necessarily be relatively small in order to avoid piling up of metal which could negate true roller action and impose friction loads.

To start the working operation, the roller is given the desired lead angle and positioned with the point 11 lying on the projection of the inner boundary 10. Incidentally, it is to be noted here that the conical surface 2 is oriented with respect to the conical surface 1 so that when the roller moves into the metal of the surface 8, the surface 2 clears or is not in contact with the blank. As a practical matter, complete clearance between the surface 2 and the blank is not always possible due to the elasticity of the metal. However, this has a desirable ironing effect as will be noted later.

With the roller oriented as explained above, the blank 6 is rotated, and then the roller is made to move downwardly and parallel to the axis 7. When the roller or the surface 1 contacts the top edge 13 of the surface 8, it begins to rotate about its axis 3. As the roller is moved parallel to the axis 7, it begins to exert a force on the surface 8. This force is parallel to the axis 7 or perpendicular to the thickness dimension $t$ of the surface 8. In FIGURE 4, the force vector is indicaed at 14. As the roller is moved along, the force exerted at the point 11 causes the metal to shear along the boundary 10 and the metal in the surface 8 underneath the roller partakes of plastic flow and is moved in a direction which is generally radially outwardly and away from the body of the blank. This is indicated in FIGURE 5 where the surface on the blank after shearing is indicated at 10a and the flowed metal is indicated at 20. With continued blank and roller rotation and continued movement of the roller parallel to the axis 7, further shearing and flow takes place indicated at 10b and 20b in FIGURE 6. The metal is guided outwardly by the surface 2 and the top part of the metal is smooth.

It will be appreciated that initially the metal flows outwardly in disc or ring-like form. Fissures and cracks, however, soon develop in the ring due to the fact that the material in the ring is put under severe tension and with work hardening the metal becomes considerably less ductile. Also the flowing metal tends to curl up. As working takes place, these fissures develop into relatively large cracks so that in effect there are strings of metal which project somewhat tangentially. The tangential effect is produced by the relative motion of the roller around the blank and takes place in the same direction as the roller is moving relative to the blank. This is illustrated in FIGURE 7 where the fissures in the flowed metal are indicated at 23, and various cracks which have developed as a result of the fracturing of fissures are indicated at 24 and the strings project tangentially in a counterclockwise direction.

As mentioned above, the conical surface 2 is arranged with respect to the conical surface 1 so that during the time the surface 2 is working the blank, the surface 2 is clear of the blank. In FIGURE 4, this clearance is shown to be between ½° and 2½°. Thus, in constructing the roller, the desired lead angle and clearance determine the orientation of the conical surfaces 1 and 2 with respect to one another.

Despite the orientation of the surfaces 1 and 2, the surface 2 is not always completely divorced from the blank. This is due to the fact that metal is elastic and a portion of the metal just behind the shear point tends to bulge out into the clearance space against that part of the surface 2 just behind the point 11. Under these conditions the surface 2 irons down the metal and therefore affects the type and quality of finish.

Referring to FIGURE 4, it will be noted that the width or slant height $h$ of the conical surface 1 is greater than the thickness $t$ of the surface 8 and therefore, extends outwardly away from the surface. This is the preferred construction and disposition of the conical surface 1 with respect to the portion to be peeled off.

From the foregoing it will be apparent that the shearing and flow forces are applied serially along contiguous areas and that the incremental area over which the force is applied at any instant is extremely small as compared to the total area over which the force is applied. For example, in the removal of surface 8, the roller can be considered as contacting an imaginary ribbon helically oriented about the axis 7. It will be appreciated that the total area of the ribbon is extremely large as compared to any one instantaneous contact. Thus, the metal is peeled or removed by point or line contact and this has the virtue of providing that total instantaneous force necessary to shear and cause plastic flow to be relatively low. This, of course, is advantageous from the standpoint of ability to work metals with extremely high yield strengths and also advantageous from the standpoint of minimizing the size of the structures for supporting and rotating the blank and roller.

In removing the surface metal as described above, it will be observed that the work done by the tool or roller arises out of a rolling action rather than out of a rubbing action as is the case with conventional tools. The rolling action is of considerable importance because it is conducive to promoting the length of useful tool life.

In FIGURE 8 the blank 30 has an end or face surface 31 defined by the boundaries 32 and 33 and the peripheral edge at 34.

The blank 30 and the roller R can be supported by known machines such as for example, a boring mill having a table rotatably mounting the blank 30 for rotation about the axis 35 and with the roller R being mounted on a cross slide. The rotational axis 3 of the roller is made to lie in a plane containing the blank rotational axis 35.

For the working operation the roller R is set up so that its conical working surface 1 is positioned over the blank surface 31 with the point 11 lying on the projection of the boundary 33 and with the desired lead angle and clearance. The blank is then rotated and the roller is then made to move radially inwardly toward the axis 35. When the conical working surface 1 engages the peripheral edge 34, the roller begins to rotate. As the roller begins to move inwardly, it exerts a force which is radially directed toward the axis 35 or normal to the thickness dimension of the surface 31. As indicated in FIGURE 9, the roller exerts a shearing action along the boundary 33 and the metal flows outwardly away from the blank as indicated at 40. During the initial stages of plastic flow the metal moves outwardly generally in disc-like form, and then with continued plastic flow fissures and cracks develop. As the roller moves closer to the axis 35, the flowing metal curls and fractures and cracks to an extent that pieces actually break off or chip. The roller motion continues inwardly until the axis 35 is reached and the surface 31 is completely peeled off.

In connection with FIGURES 8 and 9, it will be apparent that the relative path of motion between the roller and the blank is in the form of an involute.

In connection with the peeling of metal of FIGURES 2 and 8, it will be understood, of course, that more than one roller may be used, for example, two rollers disposed on opposite sides of the rotational axis of the blank.

In FIGURE 10 a tubular-shaped blank 40 has an inside, peripheral, cylindrically-shaped surface 41 defined by boundaries 42 and 43. This surface is removed by the roller R operating in the same manner as described in connection with FIGURE 2, except that the roller is inside instead of outside. The roller R is oriented as heretofore described and the blank 40 is rotated about the axis 44. The roller is made to move in a direction parallel to the rotational axis 44. The roller exerts a force parallel the axis 44 and causes shear along the boundary 42 and plastic flow of the metal in a direction transverse the direction of roller force or away from the blank as indicated at 45 in FIGURE 11.

In FIGURES 12 and 13, I have shown how the invention is used to remove a flat or planar surface, for example, a surface 50 which may be one side of an ingot 51. The surface 50 has a finite thickness defined by the boundaries 52 and 53. The roller R is positioned over the ingot in juxtaposition with the surface 50 in a manner as described above. Preferably the blank is reciprocated back and forth underneath the roller and during any one reciprocation the roller is positioned so that it will penetrate into the blank and hence exert a downward force normal to the direction of the blank motion and to the thickness dimension of the surface 50. This downward force causes a shearing action along the boundary 52 and a plastic flow in a direction generally transverse to the direction of force application or as indicated at 54 in FIGURE 13. The back and forth blank motion and downward roller adjustment is continued until the surface 50 is peeled away.

I claim:

1. In a method of peeling surface metal from a blank comprising the steps of:
    taking a blank having a surface of finite thickness to be peeled from the body of the blank;
    taking a roller having a peripheral conical surface and causing relative motion between roller and blank in a first direction to cause the roller to rotate while simultaneously causing relative motion between roller and blank in a second direction normal to first said direction so that with said motions the conical roller surface will serially engage along a path with metal constituting said blank surface;
    said second direction of motion causing the conical roller surface to exert a force on the blank surface metal, the direction of force application being the same as said second direction of motion;
    said engagement and said force causing metal of the blank surface along said path to shear in the direction of application of said force and only at the innermost point of contact between the conical roller surface and the blank and also causing plastic flow of the surface metal away from the blank past the conical roller surface in a direction transverse to the direction of the force application.

2. A method in accordance with claim 1 wherein said engagement and said force application are continued so that the flowed metal cracks as it moves away from the blank.

3. The method of peeling surface metal from a blank comprising the steps of:
    taking a blank having a cylindrically-shaped peripheral surface to be peeled from the body of the blank;
    rotating said blank about an axis co-axial with the axis of said surface;
    taking a roller having a peripheral conical surface and engaging the conical surface of the roller with one edge of said blank surface and then moving the roller in a direction parallel said rotational axis,
    said blank and roller motions effecting a path of roller motion which is helical about said rotational axis, and
    said axial roller motion causing said conical roller surface to exert a force in a direction parallel said rotational axis,
    said engagement and said force causing metal of the blank surface along said path to shear in the direction of application of said force and only at the innermost point of contact between the conical surface and the blank and also causing plastic flow of the surface metal away from the blank past the conical rolling surface in a direction transverse to the direction of force application.

4. The method of peeling surface metal from a blank comprising the steps of:
    taking a blank having a cylindrically-shaped end surface to be peeled from the body of the blank;
    rotating said blank about an axis co-axial with the axis of said surface; and
    taking a roller having a peripheral conical surface and engaging the conical surface of the roller with the peripheral edge of said blank surface and then moving the roller radially inwardly towards said rotational axis,
    said inward roller motion causing said conical roller surface to exert a force in a direction toward said rotational axis and
    said blank and roller motions effecting a path of relative roller motion which is involute about said axis,
    said engagement and said force causing the metal of the blank surface along said path to shear in the direction of application of said force and only at the innermost point of contact between the conical surface and the blank and also causing plastic flow of the surface metal away from the blank past the conical roller surface in a direction transverse to the direction of force application.

5. The method of peeling surface metal from a blank comprising the steps of:
    taking a blank having a generally planar surface to be peeled from the body of the blank;
    moving the blank along a straight axis;
    taking a roller having a peripheral conical surface and engaging the conical surface of the roller along one edge of said blank surface and while engaged the roller being positioned so that the conical surface can exert a force transverse to the direction of blank motion;
    reversing the direction of blank motion and maintaining the roller in engagement and in a position to exert said force,
    the reciprocating blank motion defining a path of relative roller motion which is back and forth across the blank;
    said engagement and said force causing metal of the blank along said path to shear in the direction of application of said force and only at the innermost point of contact between the conical surface and the blank and also causing plastic flow of the surface metal away from the blank past the conical roller surface in a direction transverse to the direction of force application.

References Cited in the file of this patent

UNITED STATES PATENTS

| | | |
|---|---|---|
| 2,025,421 | Rippel | Dec. 24, 1935 |
| 2,054,311 | Adams | Sept. 15, 1936 |
| 2,127,523 | Kraus | Aug. 23, 1938 |
| 2,180,823 | Harrison | Nov. 21, 1939 |
| 2,233,724 | Bannister et al. | Mar. 4, 1941 |
| 2,651,223 | Hahn | Sept. 8, 1953 |
| 2,936,679 | Thuerwachter | May 17, 1960 |

FOREIGN PATENTS

| | | |
|---|---|---|
| 616,204 | Great Britain | Jan. 18, 1949 |